United States Patent [19]

Ogiwara et al.

[11] Patent Number: 5,257,174
[45] Date of Patent: Oct. 26, 1993

[54] ENGINE-DRIVEN POWER GENERATING SYSTEM WITH OVER-CURRENT PROTECTION AND STATOR TEETH WITH GROOVES ON A TOP SURFACE

[75] Inventors: Kazuyuki Ogiwara; Keisuke Okada; Hiroshi Kobiyama, all of Nitta, Japan

[73] Assignee: Sawafuji Electric Co., Ltd., Tokyo, Japan

[21] Appl. No.: 661,900

[22] Filed: Feb. 27, 1991

[30] Foreign Application Priority Data

Feb. 28, 1990 [JP] Japan .............................. 1-19966[U]
Feb. 28, 1990 [JP] Japan .................................. 2-48006

[51] Int. Cl.$^5$ ........................................... H02M 5/458
[52] U.S. Cl. ..................................... 363/36; 310/179;
322/90; 363/37; 363/41; 363/56
[58] Field of Search .................... 363/37, 46, 56, 98,
363/63; 322/90; 310/179; 318/597

[56] References Cited

U.S. PATENT DOCUMENTS

| | | | |
|---|---|---|---|
| 4,325,095 | 4/1982 | Hart | 363/98 |
| 4,710,686 | 12/1987 | Guzik | 363/98 |
| 4,918,592 | 4/1990 | Shimizu | 363/50 |
| 4,973,896 | 11/1990 | Shiga et al. | 322/90 |
| 5,021,936 | 6/1991 | Nishizawa et al. | 363/41 |

FOREIGN PATENT DOCUMENTS 157275 12/1981 Japan ................................ 363/41

Primary Examiner—William H. Beha, Jr.
Attorney, Agent, or Firm—McGlew and Tuttle

[57] ABSTRACT

An engine-driven power generating system having a bridge circuit section in which low-frequency switching elements are driven alternately by low-frequency drive signals, and high-frequency switching elements driven by high-frequency drive signals during the ON period of the low-frequency switching elements are connected in a bridge network, and an inverter circuit section having a drive signal supply circuit for supplying low-frequency and high-frequency drive signals are each supplied to the low-frequency and high-frequency switching elements that form a pair; the a-c voltage generated by an engine-driven a-c generator is converted into d-c voltage that is in turn converted into a predetermined level of low-frequency a-c voltage; characterized in that an overcurrent detecting circuit for detecting an overcurrent flowing in the bridge circuit section at a level higher than a predetermined level, a drive-signal control circuit that outputs to a drive-signal supply circuit, when the overcurrent detecting circuit detects an overcurrent during a half-cycle of the low-frequency signal in which the low-frequency switching element is turned on, a signal which turns off at least any one of the low-frequency and high-frequency switching elements to be turned on during the half-cycle after the detection of the overcurrent, and a low-pass filter for obtaining a sine-wave waveform on an output end are provided.

6 Claims, 12 Drawing Sheets

ENGINE-DRIVEN POWER GENERATING SYSTEM WITH OVER-CURRENT PROTECTION AND STATOR TEETH WITH GROOVES ON A TOP SURFACE

FIELD OF THE INVENTION

This invention relates generally to an engine-driven power generating system, and more particularly to an engine-driven power generating system for rectifying the a-c output generated by an a-c generator driven by an engine into d-c power. The d-c power is in turn converted into a predetermined level of low-frequency a-c voltage using an inverter circuit driven by a pulse-width modulated (PWM) signal. The inventor circuit has an overcurrent protective device for protecting the switching elements for converting d-c power into a-c power from being damaged by overcurrent.

BACKGROUND OF THE INVENTION

In an engine-driven a-c generator, the frequency generated is dependent on the revolution of the engine. In order to stably produce an a-c voltage of a predetermined frequency, or a commercial frequency of 50 Hz or 60 Hz, for example, without being affected by changes in engine revolution, the a-c voltage generated by an a-c generator is converted into d-c voltage, which is in turn converted into an a-c voltage again using an inverter circuit.

An inverter circuit driven by pulse-width modulated (PWM) signals is usually used to convert a d-c power into an a-c power having a commercial frequency. Switching, elements of the inverter circuits are apt to be subjected to overcurrent, and are generally equipped with an overcurrent protective device.

The overcurrent protective device of the prior art detects, with a detecting resistor, the load current flowing in a switching element, and turns off the switching element when the detected load current exceeds a predetermined overcurrent setting.

As a result, this on-off operation is continued in a self-oscillation fashion so long as loading conditions remain unchanged. If the load current is of a value exceeding the dielectric strength of the switching element, this could destroy the switching element.

There is a method in which the inverter circuit is cut off as soon as an overcurrent is detected, and thereafter kept from being reset unless a reset signal is intentionally activated. This method, however, is not suitable for such a load like incandescent lamps because the inverter circuit could be kept cut off if used on a load, such as incandescent lamps where a current several to several dozens times as large as the rated current flows at the time of lighting.

As a power distribution system for distributing power to the engine-driven power generator, a technique disclosed in Japanese Patent Application No. 292111/1985 is publicly known.

In the power distribution system, FETs and other elements are used as a bridge-type inverter, step-down type chopper-type regulator and other switching means.

Since these elements are voltage-driven type elements, the capacity of the drive circuit can be reduced. The fact that gate voltage is applied to the source terminal, however, poses no problems if the source terminal is common to the earth, but requires an independent drive-circuit power source if the source terminal is not common to the earth.

For example, FIG. 7 is a circuit diagram of a bridge-type inverter, and FIG. 8 is that of a chopper-type regulator.

In the figures, reference numeral 305 refers to a load; 306 to a d-c power supply; and 311 through 315 to FETs, respectively.

The source terminals of the transistors FET311 and FET312 shown in FIG. 7 are connected to the load 305, and the source terminal of the transistor FET315 shown in FIG. 8 is also connected to a diode, coil, capacitor, load, etc. So, both do not form grounded-source circuits, and an independent power source for gate pulses is required with respect to the source terminal of each element. With such element configurations, therefore, an insulating transformer is used for the power circuit, or an insulating-type d-c/d-c converter is required. This may make the size of the power source unwantedly large.

FIG. 9 is a circuit diagram of a bridge-type inverter in which part of the circuit shown in FIG. 7 was replaced with a bipolar transistor, and FIG. 10 is a circuit diagram of a chopper-type regulator in which part of the circuit shown in FIG. 8 was replaced with a bipolar transistor. In the figures, reference numeral 316 through 324 refer to bipolar transistors. If the aforementioned power source means cannot be employed due to limitations in equipment size, circuits have to be constructed with bipolar transistors and other means, as shown in FIGS. 9 and 10.

Consequently, additional power is required in the drive circuit for bipolar transistors, and switching frequency cannot be set a high level. That is, advantages of FETs cannot be enjoyed.

As described above, if FETs are used as control elements, independent power sources are required, making the size of the power supply unwantedly large. On the other hand, if bipolar transistors are used as control elements, a large capacity of power source is required and switching frequency cannot be set at a high level.

In engine-driven generators, rotating-field type synchronous motors are generally used. In rotating-field type synchronous motors of an output of several hundred watts to several kilowatts, a stator 402 having as many as 36 slots 401, as shown in FIG. 13, if often used.

In the manufacture of engine-driven generators, the need for simplifying windings by reducing the number of slots of the stator is strongly felt to facilitate automation of wire winding operation, improve product quality, and reduce manufacturing manhours.

There may arise a problem in performance, however, merely reducing the number of slots 401. FIG. 14 shows the waveform of no-load voltage for a synchronous motor having 36 slots, and FIG. 15 shows the waveform of no-load voltage for that having 18 slots. As is evident from FIG. 15, slot ripples in the voltage waveform may pose a problem.

In portable type engine-driven generators, it is desired that power of a quality close to commercial power in terms of characteristics, and there is a conflict between reducing the number of slots 401 and reducing ripples.

There can be a means for improving slot ripples by skewing the rotor slots, for example, but it is difficult to substantially reduce the number of slots since there are limitations in improving ripples in terms of manufacturing process.

SUMMARY OF THE INVENTION

This invention is intended to overcome the aforementioned problems. To achieve this object, the engine-driven power generating system of this invention comprises a bridge circuit section in which a low-frequency switching element driven alternately by low-frequency drive signals, and a high-frequency switching element driven by high-frequency drive signals during the ON period of the low-frequency switching elements are connected in a bridge network. An inverter circuit section has a drive-signal supply circuit for supplying low-frequency and high-frequency drive signals to the low-frequency and high-frequency switching elements that form a pair. The a-c voltage generated by an engine-driven a-c generator is converted into d-c voltage that is in turn converted into a predetermined level of low-frequency a-c voltage. An overcurrent detecting circuit is provided for detecting an overcurrent flowing in the bridge circuit section at a level higher than a predetermined level. A drive-signal control circuit transmits to a drive-signal supply circuit, when the overcurrent detecting circuit detects an overcurrent during a half-cycle of the low-frequency signal in which the low-frequency switching element is turned on. A signal turns off at least any one of the low-frequency and high-frequency switching elements being turned on during the half-cycle after the detection of the overcurrent. A low-pass filter is also provided for obtaining a sine-wave waveform on an output end.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE EMBODIMENT

Figure 1:
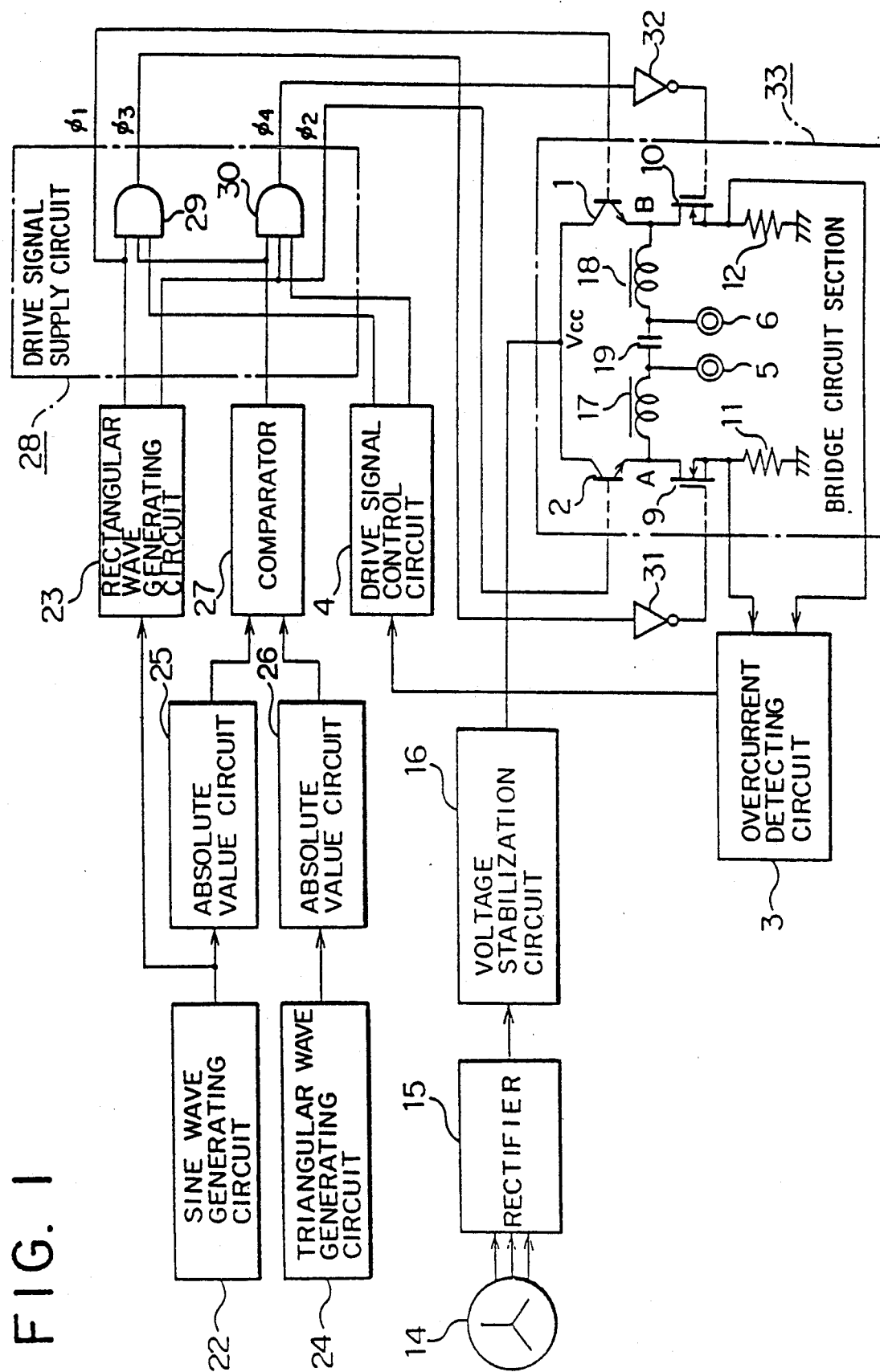
FIG. 1 is a structural diagram showing the essential part of a power generating system embodying this invention.
Figure 3:
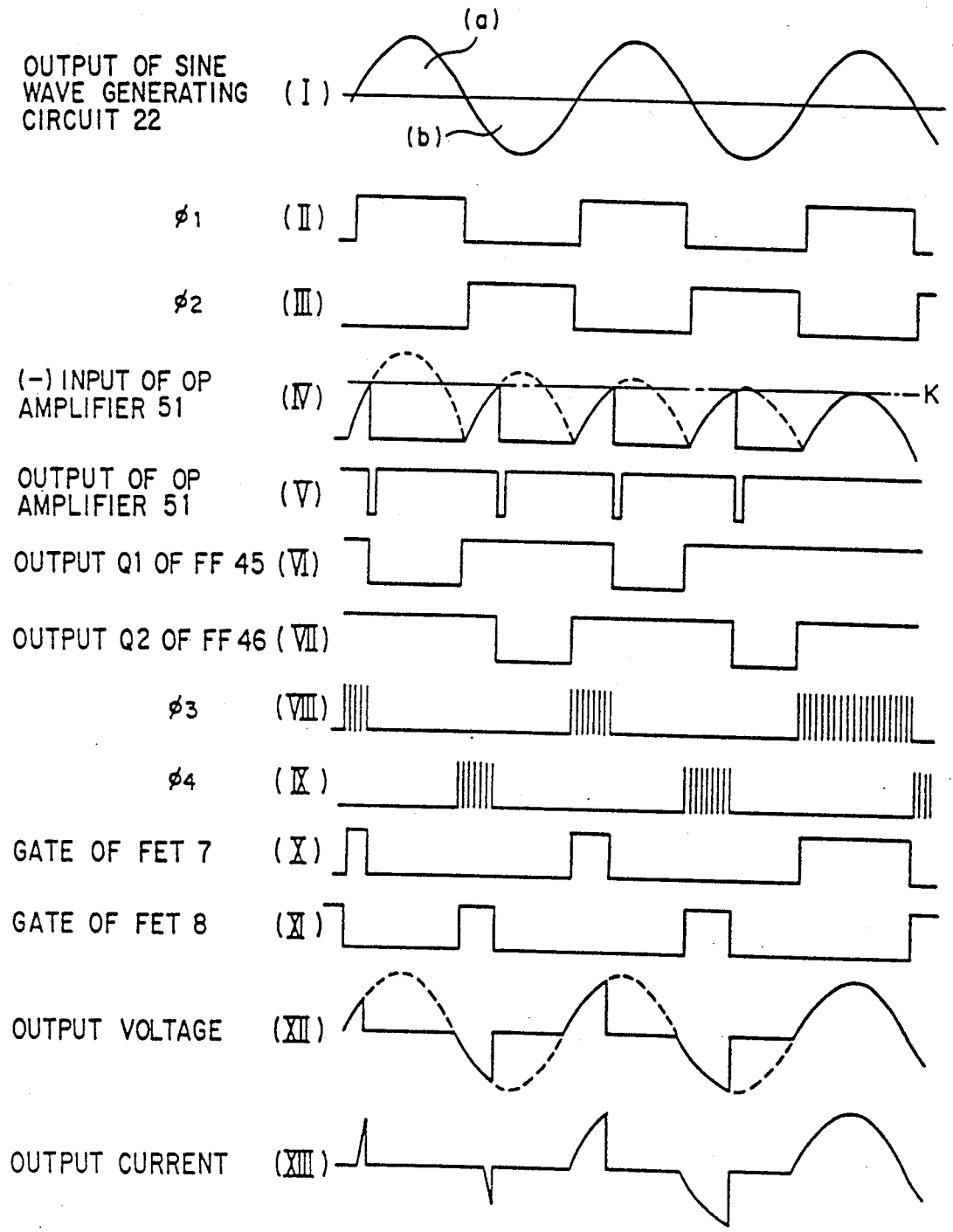
FIG. 3 is a diagram of assistance in explaining waveforms in a section relating to overcurrent protection.
Figure 4:
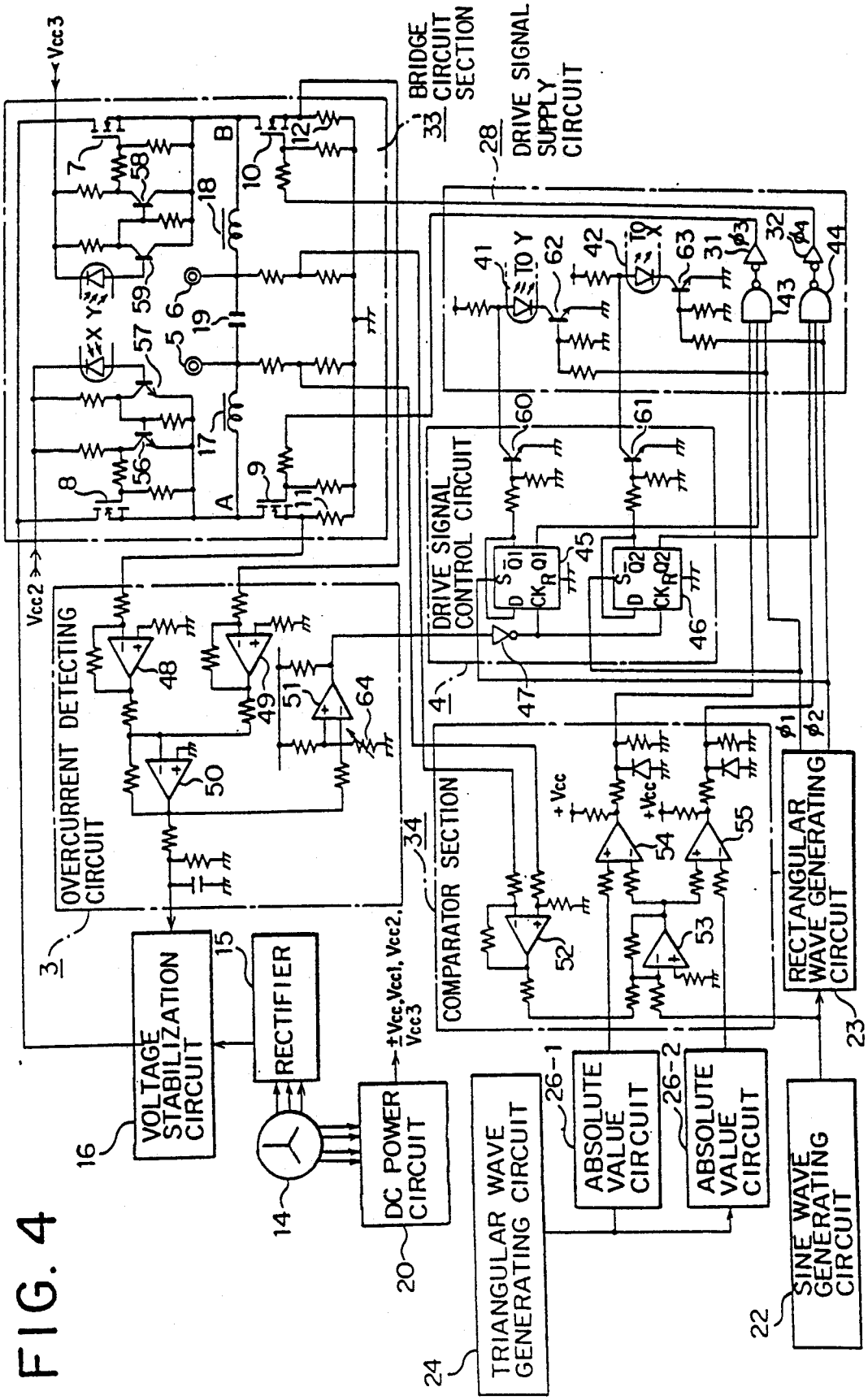
FIG. 4 is a diagram illustrating the circuit configuration of an engine-driven a-c power generating system embodying this invention.

FIG. 1 is a diagram illustrating the essential part of a power generating system relating to this invention. FIG. 2 is a diagram of assistance in explaining waveforms at various points in a bridge circuit. FIG. 3 is a diagram of assistance in explaining the part relating to overcurrent protection. FIG. 4 is a circuit diagram of an engine-driven power generating system of this invention.

In FIG. 1, reference numerals 1 and 2 refer to transistors; 3 to an overcurrent detecting circuit; 4 to a drive-signal control circuit; 5 and 6 to output terminals; 9 and 10 to FET transistors; 11 and 12 to current detecting resistors; 14 to a three-phase a-c generator; 15 to a rectifier; 16 to a voltage regulating, or stabilizing circuit; 17 and 18 to inductors; 19 to a capacitor; 22 to a sine-wave generating circuit; 23 to a rectangular-wave generating circuit; 24 to a triangular-wave generating circuit; 25 and 26 to absolute-value circuits; 27 to a comparator; 28 to a drive-signal supply circuit; 29 and 30 to an AND circuit; 31 and 32 to a NOT circuit; and 33 to a bridge-circuit section, respectively.

The sine-wave generating circuit 22 is an oscillator generating a sine wave having a predetermined low frequency, that is, a commercial frequency such as 50 Hz or 60 Hz, in which known circuits, such as a Vienna bridge oscillator, are used. The frequency of the a-c output voltage across the output terminals 5 and 6 is determined by the oscillation frequency of the sine-wave generating circuit 22. The waveform of the sine wave generated by the sine-wave generating circuit 22 is shown in (I) of FIG. 2A.

Figure 2A:
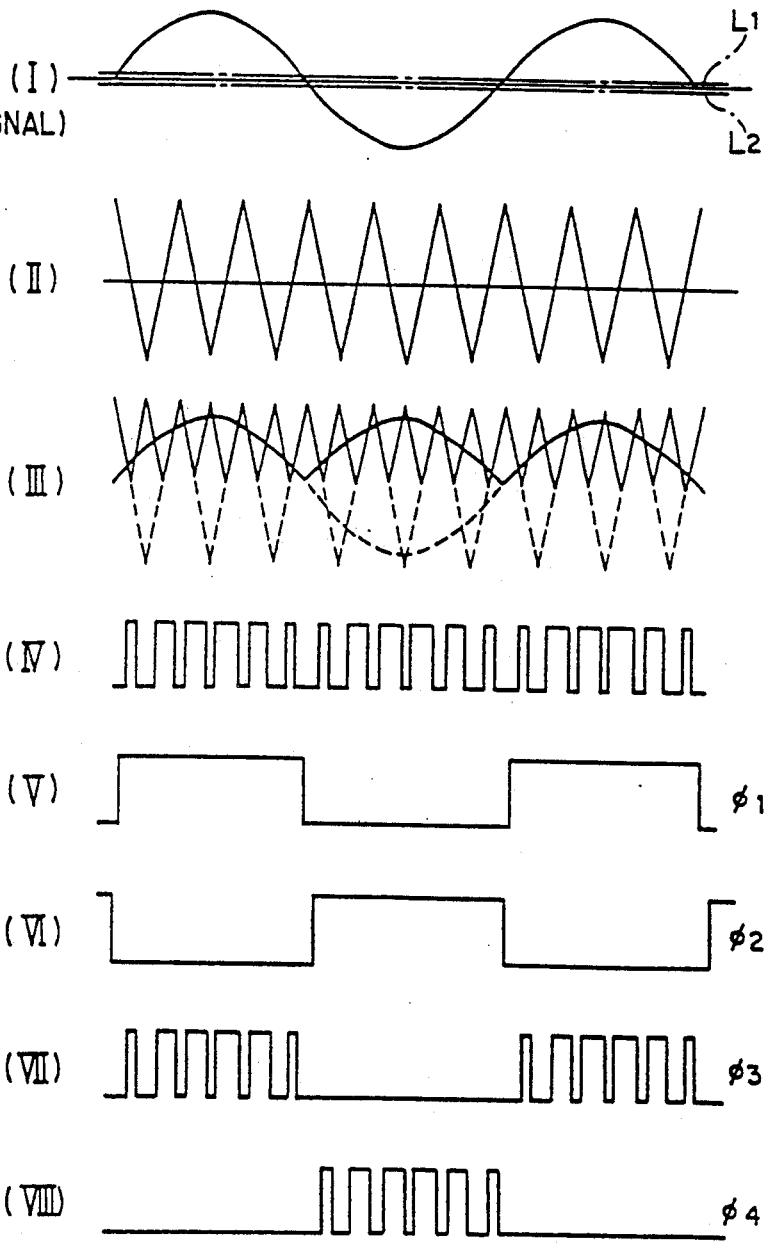
FIGS. 2A and 2B are diagrams of assistance in explaining waveforms at various points in the bridge circuit section.

The rectangular-wave generating circuit 23 receives a sine wave of a commercial frequency from the sine-wave generating circuit 22, and outputs rectangular waves, as shown in (V) and (VI) of FIG. 2A, which are in synchronization with the sine wave, corresponding to either of the positive or negative waveform thereof. These two rectangular waves are separately produced at the threshold-value levels $L_1$ and $L_2$ of the sine wave from the sine-wave generating circuit 22, as shown in (I) of FIG. 2A in such a fashion that these two rectangular waves never assume H levels simultaneously.

The triangular-wave generating circuit 24 is an oscillator generating a triangular wave shown in (II) of FIG. 2A, the oscillation frequency of which is set at a higher level (10 kHz, for example) than the frequency of the sine wave generated by the sine-wave generating circuit 22.

The absolute-value circuit 25 and 26 are full-wave rectifier circuits that fold back the negative waveform of an incoming signal wave over the positive waveform based on the zero level. The absolute-value circuit 25 folding back the negative waveform of the sine wave generated by the sine-wave generating circuit 22 while the absolute-value circuit 26 folding back the negative waveform of the triangular wave generated by the triangular-wave generating circuit 24. Thus, a waveform shown by a solid line in (III) of FIG. 2A is delivered by the two absolute-value circuits 25 and 26.

The comparator 27 is a circuit generating a PWM signal having a pulse width corresponding to the level of the sine wave that is full-wave rectified by comparing the full-wave rectified waveform of the sine wave obtained by folding back the negative waveform thereof on the positive waveform thereof in the absolute-value circuit 25 with the full-wave rectified waveform of a triangular wave having a frequency twice as high as that of the original triangular waveform obtained by folding back the negative waveform thereof on the positive waveform thereof in the absolute-value circuit 26. Consequently, a PWM signal as shown in (IV) of FIG. 2A is outputted by the comparator 27.

The drive-signal supply circuit 28 is a circuit supplying a drive signal to the switching elements of the bridge circuit section 33, in which the rectangular-wave drive signals $\phi_1$ and $\phi_2$ generated by the rectangular-wave generating circuit 23 in synchronization with the positive and negative waveforms of the sine wave generated in the sine-wave generating circuit 22, and the drive signals $\phi_3$ and $\phi_4$, as shown in (VII) and (VIII) of FIG. 2A, obtained by ANDing the above-mentioned rectangular-wave drive signals $\phi_1$ and $\phi_2$ and the PWM signals outputted by the comparator 27 in the AND circuits 29 and 30 are provided.

The drive signals $\phi_3$ and $\phi_4$ from the drive-signal supply circuit 28 are adapted to drive the FET transistors 9 and 10 of a current sink portion of the bridge circuit section 33 via the NOT circuits 31 and 32, respectively. Transistors 1 and 2 are part of a current supply portion of bridge circuit section 33. So, the transistor 1 and the FET transistor 9 are driven in every positive half cycle of the sine wave generated by the sine-wave generating circuit 22, and the transistor 2 and the FET transistor 10 are driven in every negative half cycle of the sine wave, thus always keeping the switching elements of the bridge circuit section 33 driven. Consequently, an a-c voltage of a frequency corresponding to the frequency of the sine wave generated by the sine-wave generating circuit 22 is produced across the output terminal 5 and 6.

Figure 2B:
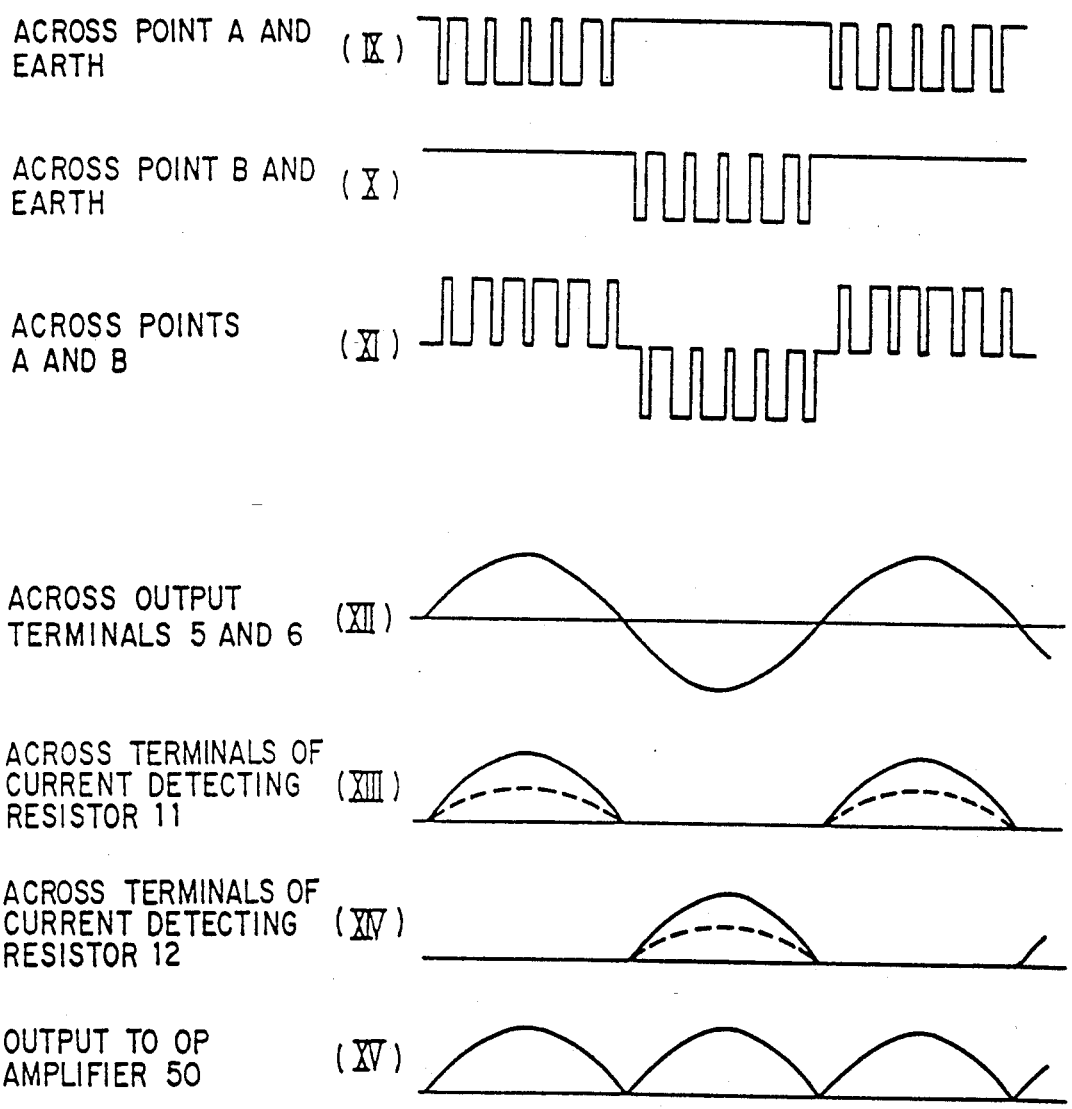

The a-c voltage generated in this way, that is, the waveform of the voltage across points A-B in the bridge circuit section 33 is as shown in (XI) of FIG. 2B, and the output voltage across the output terminals 5 and 6 is passed through a low-pass filter consisting of an inductor 17 and a capacitor 19 to shape the waveform into a sine wave shown in (XII) of FIG. 2B.

When a load is connected across the output terminals 5 and 6, a load current flows in each of current detecting resistors 11 and 12 in every positive or negative half cycle of the sine wave, and current waveforms shown in (XIII) and (XIV) of FIG. 2B are generated across the terminals of the current detecting resistors 11 and 12. The peak values of the current waveforms vary with the size of load, that is, the size of load current.

The overcurrent detecting circuit 3 is a circuit for detecting an overcurrent which is larger than a predetermined current value determined based on the load current flowing in the bridge circuit section 33, that is, the current flowing in the current detecting resistors 11 and 12, and transmits a detecting signal to the drive-signal control circuit 4 when an overcurrent is detected.

The drive-signal control circuit 4 is controlled so as to close the gate of the AND circuit 29 or 30 when the circuit 4 receives the overcurrent detecting signal. For example, when the overcurrent detecting circuit 3 detects an overcurrent during the half-cycle of the low-frequency signal at which a pair of the transistor 1 and the FET transistor 9 is turned on, that is, during the positive half-cycle of the sine wave generated by the sine-wave generating circuit 22 after the detection of the overcurrent, the drive-signal control circuit 4 causes the gate of the AND circuit 29 to be closed. Similarly, the drive-signal control circuit 4 causes the gate of the AND circuit 30 during the half-cycle of the low-frequency signal at which a pair of the transistor 2 and the FET transistor 10 is turned on, that is, during the negative half-cycle of the sine wave generated by the sine-wave generating circuit 22.

Now, assume that an overcurrent flows across the output terminals 5 and 6 during the positive half-cycle of the sine wave generated by the sine-wave generating circuit 22, for example. Then, the transistor 1 and the FET transistor 9 are turned on by the drive signals $\phi_1$ and $\phi_3$ from the drive-signal supply circuit 28, and the overcurrent is detected by the overcurrent detecting circuit 3 via the current detecting resistor 11 during the positive half-cycle. The overcurrent detecting circuit 3 immediately cause the gate of the AND circuit 29 to be closed via the drive-signal control circuit 4. With this, the AND circuit 29 prevents the PWM signal from the comparator 27 from passing during the remaining positive half-cycle after the detection of the overcurrent, and the high-frequency drive signal $\phi_3$ is controlled as shown in (VIII) of FIG. 3. During the remaining positive half-cycle after the detection of the overcurrent, therefore, the FET transistor 9 is turned off. Thus, the output voltage across the output terminals 5 and 6 disappears, and the load current, that is, the overcurrent stops flowing.

During the negative half-cycle of the sine wave generated by the sine-wave generating circuit 22, the transistor 2 and the FET transistor 10 is turned on by the drive signals $\phi_2$ and $\phi_4$ from the drive-signal supply circuit 28. Even during the negative half-cycle, when the overcurrent detecting circuit 3 detects an overcurrent larger than a predetermined current level via the current detecting resistor 12, the output voltage and overcurrent across the output terminals 5 and 6 disappear, as shown in (XII) and (XIII) of FIG. 3 during the remaining negative half-cycle after the detection of the overcurrent through similar control operations.

In this way, as soon as the overcurrent detecting circuit 3 detects an overcurrent in the bridge circuit section 33, the high-frequency drive signal $\phi_3$ for turning on the FET transistor 9 is controlled so as to forcibly turn off the FET transistor 9 during the remaining positive half-cycle and thereafter. Since a positive-wave output shaped by the low-pass filter consisting of the inductors 17 and 18 and the capacitor 19 is obtained across the output terminals 5 and 6 during the next negative half-cycle, the output voltage in the negative half-cycle gradually rises, as often found in the so-called zero-crossing detection. However, if an overcurrent exceeding a predetermined current level, that is, the overcurrent setting flows again in the current detecting resistor 12 during the negative half-cycle, the high-frequency drive signal $\phi_4$ disappears, and the FET transistor 10 that is originally to be turned on will be turned off thereafter. Then, the FET transistor 9 is turned on in the next positive half-cycle. This operating sequence is repeated thereafter. In the case of a load like an incandescent lamp, therefore, even when a current several or several dozens times as large as the rated current flows at the time of lighting, the resistance value thereof increases due to self-heating, and the timing of overcurrent detection by the overcurrent detecting circuit 3 is gradually delayed. This causes the overcurrent to be reduced, returning to the normal operations.

Although it is described in FIG. 1 for simplicity of explanation that only the high-frequency drive signals $\phi_3$ and $\phi_4$ to the FET transistors 9 and 10 are blocked, it is possible to block only the low-frequency drive signals $\phi_1$ and $\phi_2$ that drive the transistors 1 and 2 using an AND circuit, etc., and it is also possible to construct a drive-signal supply circuit 28 having such a construction as to block the drive signals $\phi_1$ and $\phi_3$, and $\phi_2$ and $\phi_4$ simultaneously.

FIG. 4 shows a circuit configuration of an engine-driven power generating system embodying this invention. Reference numerals 3 through 6, 9 through 12, 14 through 19, 22 through 24, 28 and 31 through 33 correspond to like numerals in FIG. 1. Reference numerals 7 and 8 refer to FET transistors corresponding to the transistors 1 and 2 in FIG. 1; 20 to a d-c power circuit for supplying power voltage to each circuit; 26-1 and 26-2 to absolute-value circuits corresponding to the absolute-value circuit in FIG. 1; 34 to a comparator section; 41 and 42 to photocouplers; 43 and 44 to NAND circuits; 45 and 46 to flip-flop circuits; 47 to a NOT circuit; 48 through 55 to OP amplifiers; 56 through 63 to transistors; and 64 to a variable resistor, respectively.

In the circuit configuration shown in FIG. 4, FET transistors, that is, pairs of the FET transistors 7 and 9, and the FET transistors 8 and 10, are used as the switching elements of the bridge circuit section 33. The FET transistor 7 is driven by the low-frequency drive signal $\phi_1$ via the photocoupler 41 of the drive-signal supply circuit 28, while the FET transistor 9 is driven by the high-frequency drive signal $\phi_3$ outputted by the NAND circuit 43.

Furthermore, the FET transistor 8 is driven by the low-frequency drive signal $\phi_2$ via the photocoupler 42, and the FET transistor 10 is driven by the high-frequency drive signal $\phi_4$ outputted by the NAND circuit 44.

The overcurrent detecting circuit 3 appropriately amplifies in the OP amplifiers 48 and 49 the current (whose peak values change in accordance with the magnitude of the load current) detected by the current detecting resistors 11 and 12 in every half-cycle of the low-frequency signal, as shown in (XIII) and (XIV) of FIG. 2B, synthesizes both in the OP amplifier 50 shown in (XV) of FIG. 2B, and compares in the comparator of the OP amplifier 49 the level of the synthesized waveform with the overcurrent set level arbitrarily set by the variable resistor 64 to detect an overcurrent flowing in the bridge circuit section 33.

The drive-signal control circuit 4 receives the overcurrent detecting signal detected by the overcurrent detecting circuit 3, and outputs an H-level signal to the output terminal $\overline{Q1}$ of the flip-flop circuit 45 or the output terminal $\overline{Q2}$ of the flip-flop circuit 46 to turn on the corresponding transistor 60 or 61. Since D-type flip-flop circuit are used as the flip-flop circuits 45 and 46, the output terminal $\overline{Q1}$ or Q2 of the flip-flop circuit 45 and 46 maintains the H-level until the low-frequency drive signal $\phi_2$ or $\phi_1$ for the next half-cycle from the rectangular-wave generating circuit 23 sets the flip-flop circuit 45 or 46. Consequently, when the overcurrent detecting circuit 3 detects an overcurrent in the half-cycle of a given low-frequency signal, causing the output terminal $\overline{Q1}$ of the flip-flop circuit 45, for example, to hold the H-level, the H-level on the output terminal $\overline{Q1}$ is maintained for the remaining half-cycle after overcurrent detection until the flip-flop is set by the next low-frequency drive signal $\phi_2$ from the rectangular-wave generating circuit 23, the corresponding transistor 60 is turned on during the period. Similar operation is performed for the flip-flop circuit 46, and the corresponding transistor 61 is turned on during the period in which the output terminal $\overline{Q2}$ of the flip-flop circuit 46 is held at the H-level.

The drive-signal control circuit 28 outputs from the photocouplers 41 and 42 the low-frequency drive signals $\phi_1$ and $\phi_2$ for driving the FET transistors 7 and 8, and also outputs the high-frequency drive signals $\phi_3$ and $\phi_4$ for driving the FET transistors 9 and 10 from the NAND circuits 43 and 44 via the NOT circuits 31 and 32, respectively. When the transistors 60 and 61 of the drive-signal control circuit 4 are turned on, the anode-side potential of the photocouplers 41 and 42 is reduced to the earth potential, blocking the supply of the low-frequency drive signals $\phi_1$ and $\phi_2$. At the same time, the level of the output terminals Q1 and $\overline{Q2}$ of the flip-flop circuits 45 and 46 is reduced to the L-level, causing the gates of the NAND circuit 43 and 44 to close, thus blocking the supply of the high-frequency drive signals $\phi_3$ and $\phi_4$.

The comparator section 34 consists of an OP amplifier 52 forming a differential amplifier, an OP amplifier 53 operating as an error amplifier, and two OP amplifiers 54 and 55 operating as comparators; the OP amplifiers 54 and 55 forming two comparators correspond to the comparator 27 in FIG. 1, and a sine wave outputted by the OP amplifier 53 is modulated by a triangular wave obtained in the absolute-value circuit 26-1 and 26-2 to generate a PWM signals.

Part of the sine wave obtained from the output terminals 5 and 6 is inputted to the OP amplifier 52 constituting a differential amplifier to compare the output with the sine wave of the sine-wave generating circuit 22 in the OP amplifier 53 serving as an error amplifier. In this way, by always comparing the reference sine wave of the sine-wave generating circuit 22 with the sine wave fed back from the output terminals 5 and 6, the pulse width is changed with changes in output voltage to reduce the error. As a result, a high-quality sine wave can be obtained on the output terminals 5 and 6.

Next, the operation of what is shown in FIG. 4 will be described using FIG. 3 which is a waveform diagram of circuit protecting means.

Now assume that a load is connected in a cycle in which a pair of the FET transistors 7 and 9 are turned on, and an overcurrent occurs in the positive half-cycle (a) shown in (I) of FIG. 3. The terminal voltage of the current detecting resistor 11 connected between the ground and the source of the FET transistor 9 in the bridge circuit section 33 rises, and the terminal voltage of the detecting current amplified by the OP amplifier 48 exceeds the voltage level K set by the variable resistor 64 in the OP amplifier 51 of the comparator, as shown in (IV) of FIG. 3, the output of the OP amplifier 51 is reversed from the H-level to the L-level, as shown in (V) of FIG. 3.

The output of the OP amplifier 51 is reversed again by the Schmitt-trigger-type NOT circuit 47 and inputted to the CK terminals of the flip-flop circuits 45 and 46.

The previous state of the flip-flop circuits 45 and 46 is such that the output terminal Q1 was at the H-level and the output terminal Q2 was at the L-level, as shown in (VI) and (VII) of FIG. 3. As is evident from the input signals to the NAND circuits 43 and 44 of FIG. 4, PWM signals generated by the comparator section 34 is outputted by the NAND circuits 43 and 44 in synchronization with the low-frequency drive signals $\phi_1$ and $\phi_2$ outputted by the rectangular-wave generating circuit 23.

In the meantime, when the flip-flop circuit 45 is triggered by the overcurrent detected by the overcurrent detecting circuit 3, and the output terminal Q1 is reversed from the H-level to the L-level, the output level of the NAND circuit 43 becomes the L-level. This allows the gate signal of the FET transistor 9 to disappear, turning off the FET transistor 9. At the same time, the output terminal $\overline{Q1}$ of the flip-flop circuit 45 is reversed from the L-level to the H-level, turning on the transistor 60, thus blocking the operation of the photocoupler 41 that transmits to the FET transistor 7 the low-frequency drive signal $\phi_1$ from the rectangular-wave generating circuit 23. Consequently, the FET transistor 7 is also turned off. This results in a state where no voltage is applied to the load connected across the output terminals 5 and 6. As the load current is cut off, the terminal voltage of the current detecting resistor 11 drops, reversing the output of the OP amplifier 51 of the comparator from the L-level to the H-level. The flip-flop circuit 45, however, keeps the output terminals Q1 and $\overline{Q1}$ at the L-level and H-level, respectively, until the next pulse appears. So, this state continues during the positive half-cycle of (a) shown in (I) of FIG. 3, that is, till the end of the low-frequency drive signal $\phi_1$ outputted by the rectangular-wave generating circuit 23.

As the low-frequency positive half-cycle (a) ends, next comes the negative half-cycle shown by (b), that is, the synchronization of the low-frequency drive signal $\phi_2$ outputted by the rectangular-wave generating circuit 23.

Since the drive signal $\phi_1$ is inputted to the set terminal of the flip-flop circuit 46, and the next drive signal $\phi_2$ is inputted to the set terminal of the flip-flop circuit 45, the flip-flop circuit 45 is set at the rise of the drive signal $\phi_2$.

On the other hand, as the flip-flop circuit 46 is set by the drive signal $\phi_1$ in the previous synchronization, the current synchronization is started normally.

However, when the load connected to the output terminals 5 and 6 is still in the state of overcurrent, the output terminal Q2 of the flip-flop circuit 46 is reversed from the H-level to the L-level, as in the case of the aforementioned positive half-cycle, as soon as the current flowing in the other pair of FET transistors 8 and 10, which are in the ON state, exceeds a predetermined overcurrent detection set value. This causes the gate of the NAND circuit 43 to close, turning on the transistor 61, and cutting off the output as in the case of the aforementioned positive half-cycle.

The circuit configurations of the overcurrent detecting circuit 3, the drive-signal control circuit 4, the drive-signal supply circuit 28, the bridge circuit section 33, and the comparator section 34, as shown in FIG. 4, represent only typical examples, and may therefore be constructed by other circuits. As described with reference to FIG. 1, the drive-signal supply circuit 28 may block the operation of high-frequency and low-frequency switching elements individually or in combination.

As described above, this invention makes it possible to prevent switching elements from being damaged even when an overcurrent exceeding the strength of switching elements flows in the circuits at the time of turning on the switch.

Even when the overcurrent is cut off, the switching elements can be protected since the system is started up with a gradually rising voltage in the next half-cycle.

Even if the output is shortcircuited, the shortcircuit current is detected at a certain level, and the circuit is cut off during a half-cycle of the voltage. When the state of over-current continues into the next half-cycle, the operation to cut off the circuit is repeated even after the current reaches the overcurrent detecting set value in each half-cycle, and upon release of shortcircuiting, the circuit is automatically restored to the normal state.

Next, a power distribution system for distributing power to the engine-driven power generating system of this invention will be described.

Figure 6:
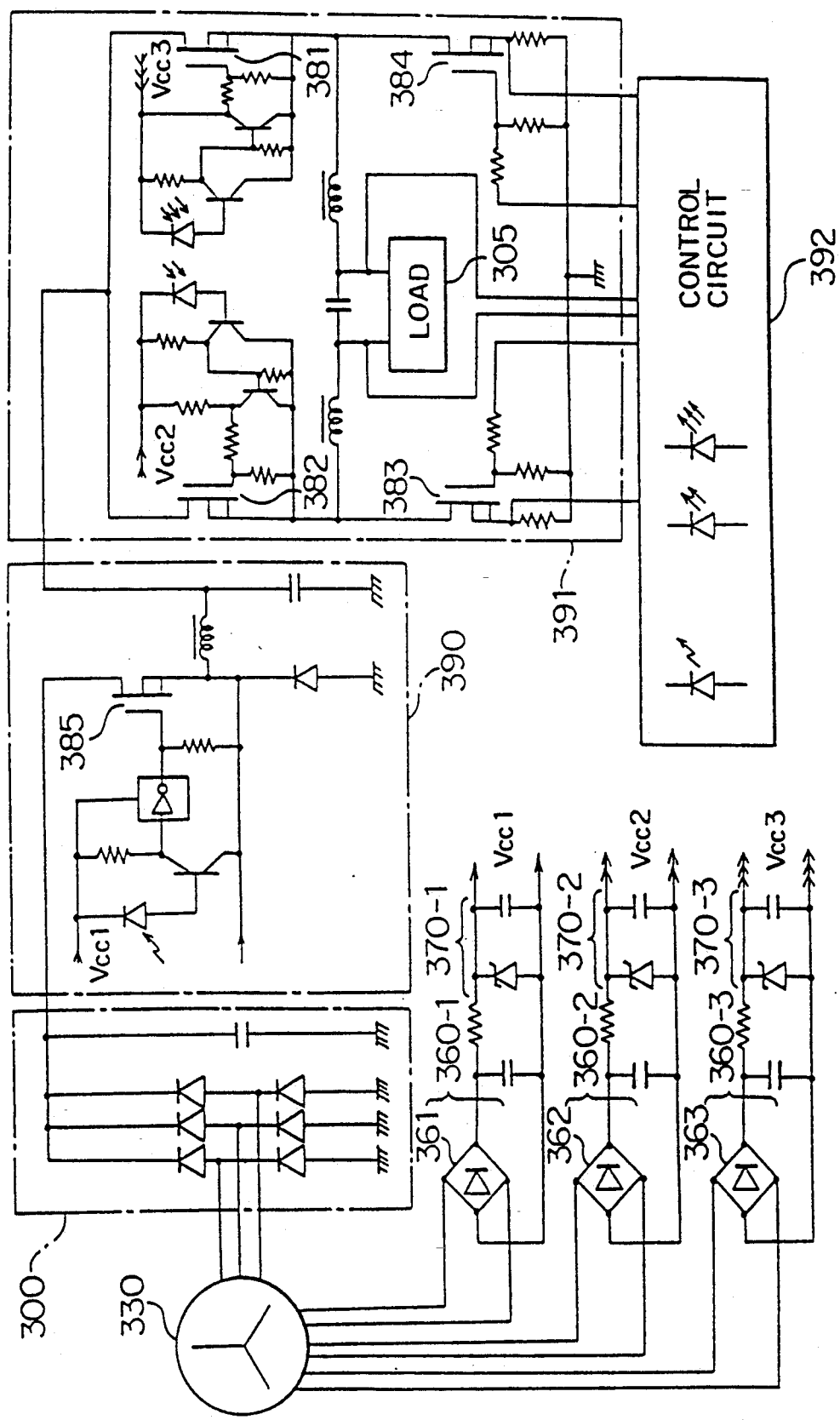
FIG. 6 is an embodiment of this invention.
Figure 7:
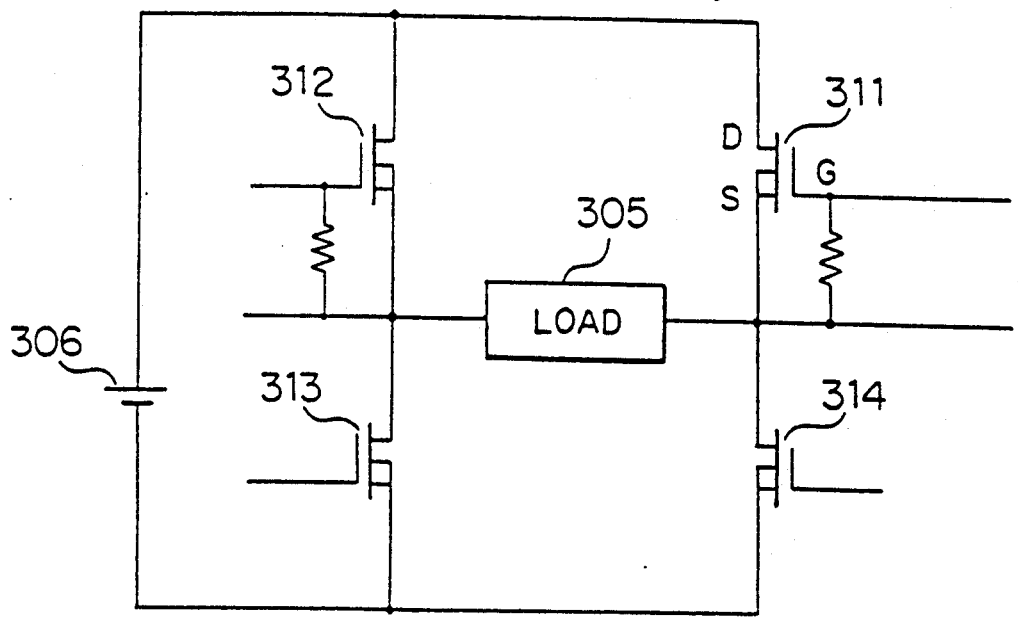
FIG. 7 is a circuit diagram of a bridge-type inverter using FETs.
Figure 8:
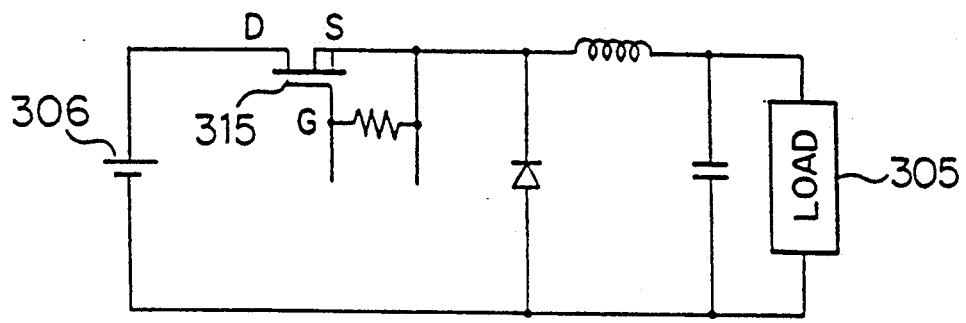
FIG. 8 is a circuit diagram of a chopper-type regulator using FETs.
Figure 9:
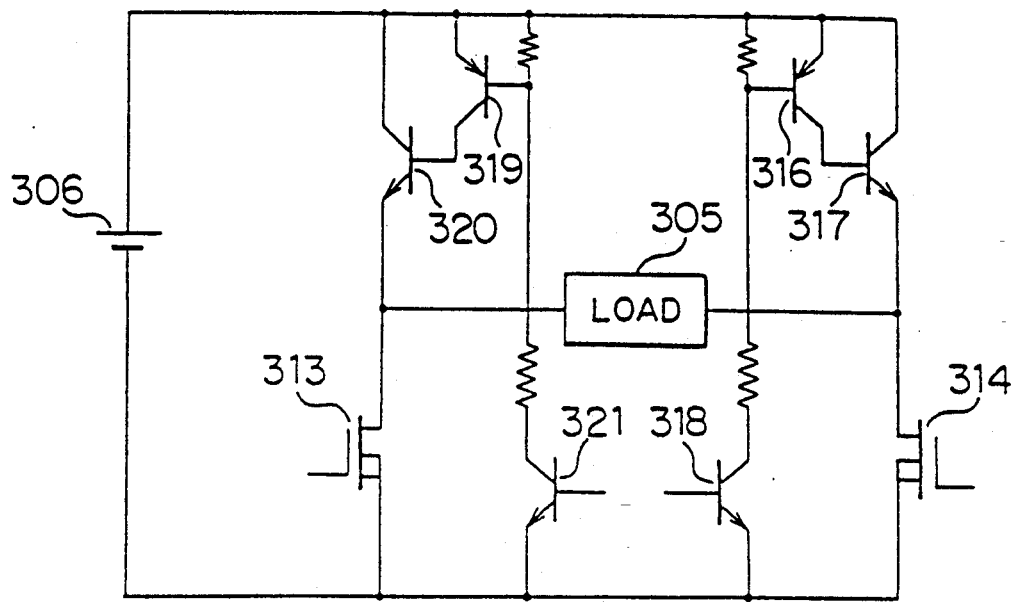
FIG. 9 is a bridge-type inverter in which part of the circuit shown in FIG. 7 was replaced with bipolar transistors.
Figure 10:
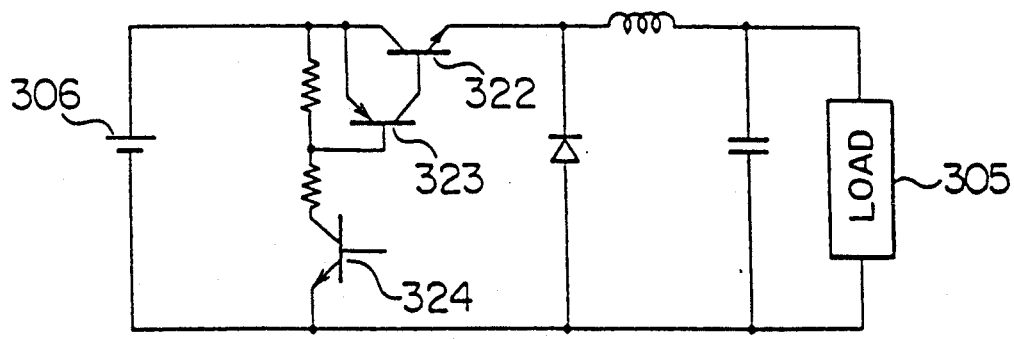
FIG. 10 is a circuit diagram illustrating a chopper-type regulator in which part of the circuit shown in FIG. 8 was replaced with bipolar transistors.

FIG. 6 shows an example of the power distribution system.

In the figure, reference numeral 330 refers to a generator; 361 through 363 to bridge type rectifier circuits; 381 through 385 to FETs; 300 to a three-phase bridge-type rectifier circuit; 390 to a chopper-type regulator; 391 to a bridge-type inverter circuit; and 392 to a control circuit for controlling the chopper-type regulator circuit 390 and the bridge-type inverter circuit 391, respectively.

This embodiment relates to a power conversion device in which the a-c voltage generated in a main winding provided in the generator is rectified into a d-c voltage by the three-phase bridge-type rectifier circuit 300, and the resulting d-c voltage is regulated in the chopper-type regulator circuit 390. The regulated d-c voltage is converted into an a-c voltage.

First, the mode of control performed by the control circuit 392 will be described.

The bridge-type inverter circuit 391 performs the so-called PWM-type inverter control. FETs 381 and 382 are driven via photothyristor couplers. As rectangular-wave drive signals are regularly transmitted to these FETs 381 and 382 at every half-cycle of the frequency of an a-c voltage to be outputted, control is effected so that the FETs 381 and 382 alternately repeat on-off operation.

To the FET 383 (and the FET 384), on the other hand, high-frequency drive signals of the so-called PWM type are inputted during the period in which the FET 381 (382) that forms a pair with the FET 383 (384) are in the ON state. That is, an a-c voltage is supplied to the load 305.

When the chopper-type regulator circuit 390 detects the voltage applied to the load 305 and finds that the detected voltage is lower than zero or a predetermined voltage, the FET 385 is brought into the ON state via the photothyristor coupler, and when the detected voltage is found to be higher than a predetermined voltage level, the FET 385 is brought into the OFF state. In this way, control is effected so that a-c power is stabilized by stabilizing the output of the chopper-type regulator circuit 390.

When the source voltage of the FETs 383 and 384 are detected, and an abnormality or overload is detected in the device, an a-c output is prevented from being outputted by suppressing the output of the chopper-type regulator circuit 390 so as not to bring the FET 385 into the ON state.

Independent power sources are required for the FETs 381 and 382, and 385, which are not common-source type circuits.

Figure 5:
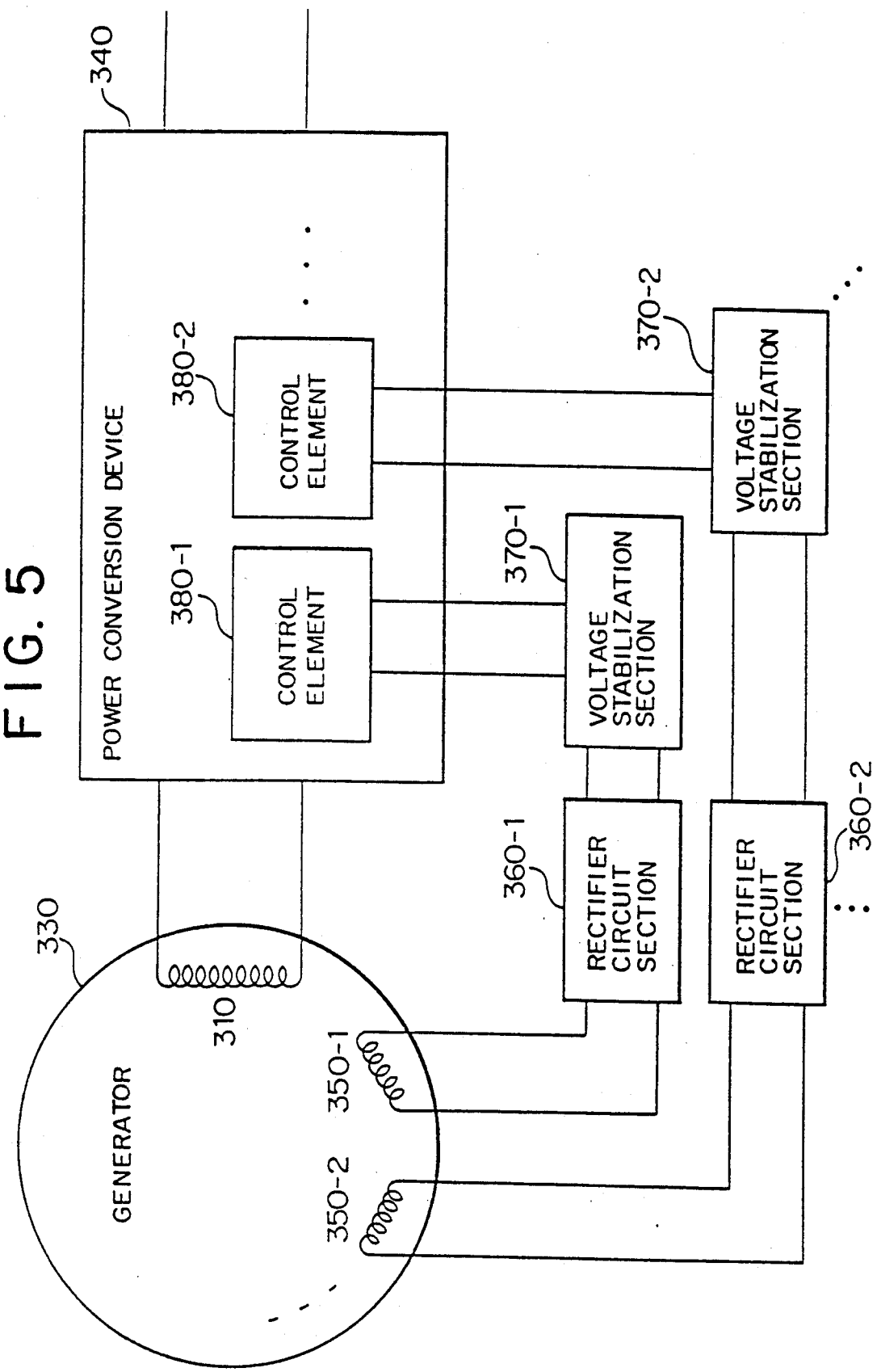
FIG. 5 is a diagram illustrating the essential part of this invention.

To cope with this, an independent winding (corresponding to 350-1 shown in FIG. 5) is provided separately from the main winding to each of the FETs 381 and 382, and 385, and the a-c voltages generated in these windings are rectified by the bridge-type rectifier circuits 361 through 363, and the resulting voltages are stabilized by connecting, resistors, zener diodes and capacitors. In this way, independent power sources are provided to drive FETs.

The FETs 381 and 382, and 385 are allowed to operate normally regardless of source voltage by applying the d-c voltages Vcc1 through Vcc3 thus obtained.

As described above, this invention makes it possible to provide simple forms of inverters or regulators using FETs by realizing a plurality of independent power sources by employing a circuit configuration in which independent windings are provided separately from main windings and the a-c voltages generated in the independent windings are rectified.

Next, an example of the engine-drive power generating system that can produce sine waves having less ripples will be described.

Figure 11:
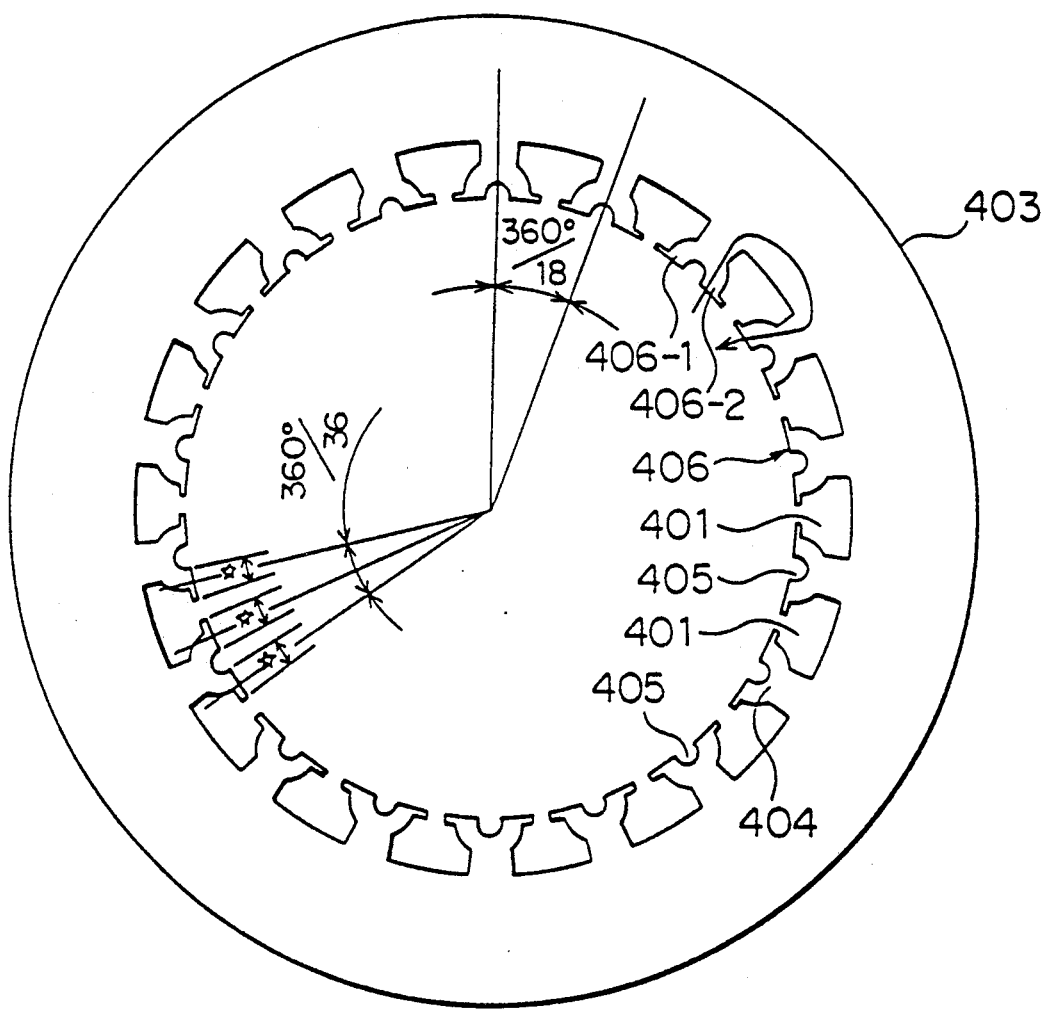
FIG. 11 is a diagram illustrating the shape of a stator core used in an engine-driven generator.

FIG. 11 is a diagram illustrating the shape of a stator core used in an engine-driven power generating system.

Figure 12:
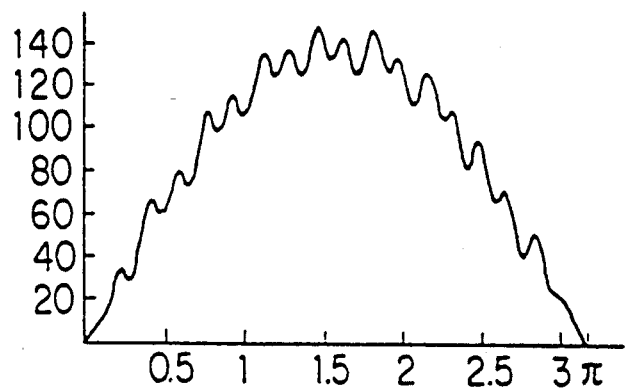
FIG. 12 is a diagram illustrating the waveform of no-load voltage in a stator core used in an engine-driven generator.

FIG. 12 is a diagram illustrating the waveform of no-load voltage.

Figure 13:
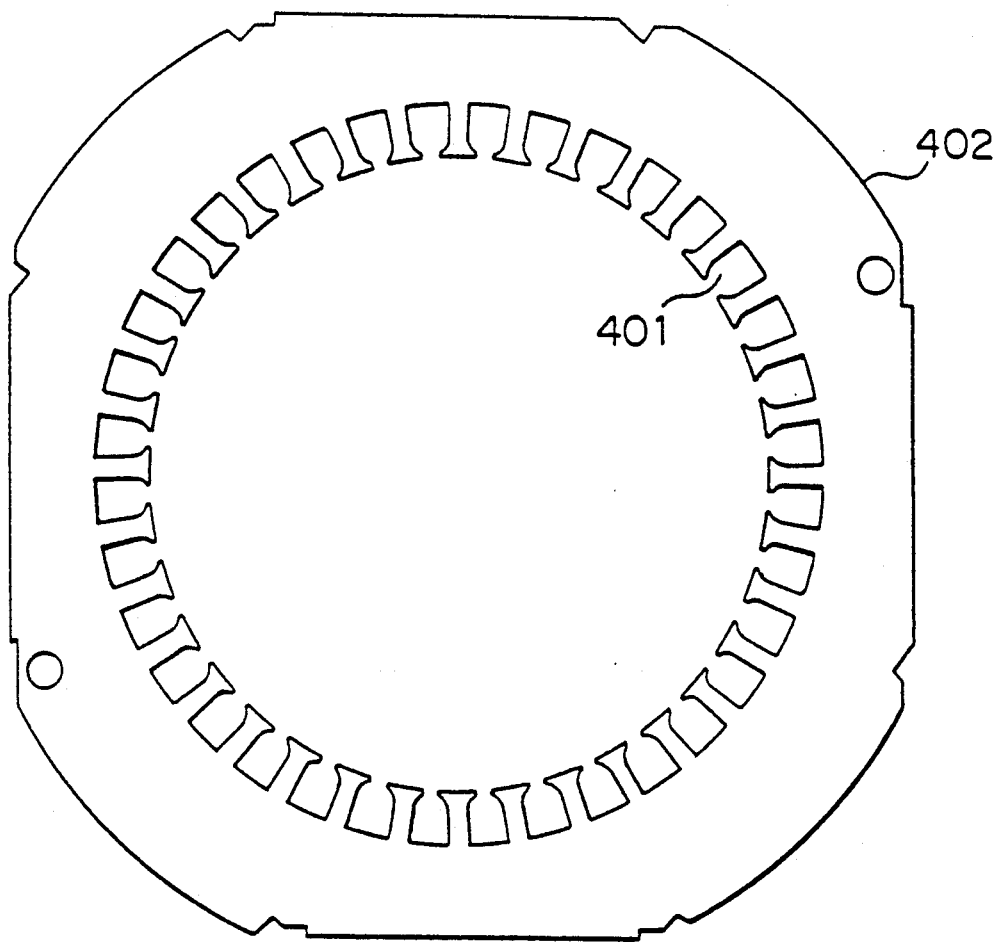
FIG. 13 is a diagram illustrating the shape of a prior-art stator core having 36 slots.

In FIG. 11, the number of slots 401 of the stator core 403 is 18, half that of the stator core shown in FIG. 13. In FIG. 11, grooves 405 are provided on the top surface of each of the teeth 404 formed between the slots 401. The groove 405 provided on the top surface of the tooth 404 divides the tooth 404 into small teeth 406-1 and 406-2. This arrangement makes the stator core shown in FIG. 11 equal in terms of external appearance and magnetic performance to the shape of a stator core having 36 slots. That is, when viewed from the rotor side of the generator, the stator core shown in FIG. 11 has virtually 36 small teeth 406 facing to the rotor.

Figure 14:
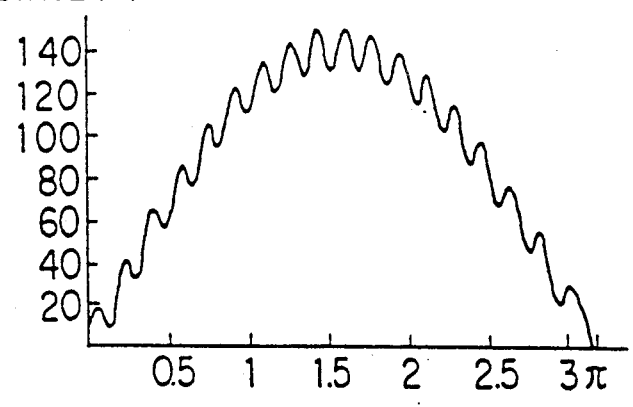
FIG. 14 is a diagram illustrating the waveform of no-load voltage in a prior-art stator core having 36 slots.
Figure 15:
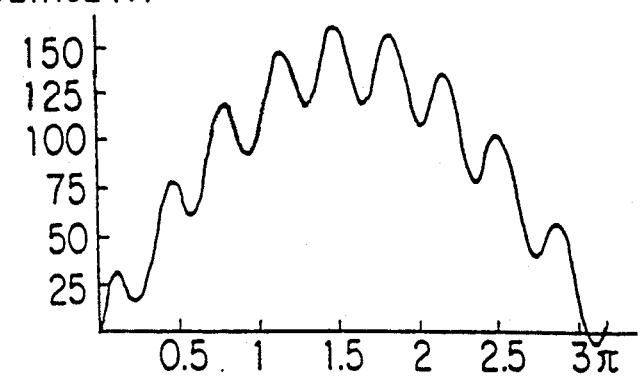
FIG. 15 is a diagram illustrating the waveform of no-load voltage in a prior-art stator core having 18 slots.

FIG. 12 shows a waveform obtained when the stator core shown in FIG. 11 is used, which is virtually equal to the waveform shown in FIG. 14 for a stator core having 36 slots. FIG. 12 indicates that even with a stator core having 16 slots, the resulting waveform can be substantially improved.

When skewing slots on a rotor (not shown) to improve the voltage waveform, using the stator core 403 shown in FIG. 11, the same effect as that obtained with the conventional skewed slots can be accomplished by skewing slots half as many as the number of the conventional slots. As a result, the skewing angle on the rotor may be 360°/36=10°, resulting in a reduction in manufacturing manhours requiring the skewing of the rotor.

Although the above description is concerned with 36 slots as often used in engine-driven generators, the same holds with stator cores other than 36-slot stator cores. That is, the voltage waveform can be improved by providing small grooves on the top surface of the teeth.

As described above, this invention makes it possible to solve the conflict between reduction in the number of slots and improvement in voltage waveform by adopting a simple shape of stator core in which grooves are provided on the top surface of the stator teeth. The reduced number of slots leads to simplified stator winding operation, or even to automated winding operation, resulting in improved automation rate and improved assembly efficiency.

Simplified stator construction also leads to reduced shortcircuiting between the insulating layers of generator windings and improved quality.

The reduced skewing angle on the rotor makes the manufacture of rotors easy.

Magnetic noises can also be reduced for the number of slots.

What is claimed is:

1. An engine-driven power generating system, comprising a bridge circuit section in which low-frequency switching elements are alternately driven by low-frequency drive signals, and high-frequency switching elemnts are driven by high-frequency drive signals during an ON period of said low-frequency switching elements; a drive signal supply circuit for supplying said low-frequency and high-frequency drive signals to said low-frequency and high-frequency switching elements, both of said switching elements forming pairs; an engine-driven a-c generator including main rectifier means for converting a-c voltage into d-c voltage; said bridge circuit section then converting said d-c voltage into a predetermined low-frequency a-c voltage said a-c generator has a stator in which grooves are provided on a top surface of teeth between slots on which generating windings are wound;

an overcurrent detecting circuit for detecting overcurrent flowing in said bridge circuit section at a level above a pre-determined current level, said overcurrent-detecting circuit including current-detecting resistors connected in series to each of said high-frequency switching elements, said overcurrent-detecting circuit measuring terminal voltages of each of said current-detecting resistors at each half-wave of said pre-determined low-frequency a-c, said overcurrent-detecting circuit indicating an overcurrent condition if said terminal voltages are above a threshold value;

a drive signal control circuit for outputting to said drive signal supply circuit a signal which, when said overcurrent detecting circuit detects said overcurrent during any one half-cycle of low-frequency signal in which low-frequency switching elements are turned on, turns off at least one of low-frequency and high-frequency switching elements being driven in the ON state during said half-cycles after the detection of said overcurrent; and a low-pass filter on an output end of said bridge circuit section is provided for obtaining a sine-wave waveform.

2. An engine-driven power generating system according to claim 1 wherein, said a-c generator includes a plurality of generating windings independent of main generating windings, a rectifier circuit section for rectifying a-c voltage generated in said independent generating windings into d-c voltage, and a voltage stabilizing section for stabilizing d-c voltage in said rectifier circuit section to a desired voltage value; and said stabilized d-c voltage being supplied as power sources for said individual controlling semiconductor elements.

3. An alternating current (a-c) power generating system comprising:
- a direct current (d-c) voltage source;
- bridge circuit means connected to said d-c voltage source and a load, and for transmitting current from said d-c source through said load in alternating directions, said bridge circuit means including a first current supply portion and a first current sink portion connected to a first terminal of said load, said bridge circuit means also including a second current supply portion and a second current sink portion connected to a second terminal of said load, said first and second current supply portions alternately supplying current to respective said first and second terminals of said load, said first and second current sink portions alternatingly removing current from said first and second terminals of said load, and from an opposite terminal to which said current is being supplied;
- signal generating means for generating a drive signal to drive said bridge circuit means at a desired frequency; and
- overcurrent detection means for sensing current flow, in said bridge circuit means, over a pre-determined level, said overcurrent detection means blocking said drive signals when an overcurrent is detected, said overcurrent detection means having a first resistor in said first current sink portion, said first resistor measuring said transmitting current through said load in a first of said alternate directions, said overcurrent detection means having a second resistor in said second current sink portion, said second resistor measuring said transmitted current through said load in a second of said alternate directions;
- a generator including a main winding and an independent winding, said generator includes a stator, said stator includes generator windings wound around a plurality of teeth, and said plurality of teeth have grooves provided on a top surface;
- said d-c voltage source having main rectifier means for transforming a-c voltage from said main winding into d-c voltage;
- one of said bridge circuit means and said signal generating means having a semi-conductor element;
- independent rectifier means for transforming a-c voltage from said independent winding into an independent d-c voltage;
- a voltage stabilizing means for stabilizing d-c voltage in said independent rectifier means to a desired voltage; and
- said stabilized d-c voltage being supplied as power to said semi-conductor element.

4. A system in accordance with claim 3, wherein:
- when said overcurrent detection means detects said overcurrent in said first direction, said overcurrent detection means only blocks a portion of said drive signal corresponding to driving said transmitted current in said first direction; and
- when said overcurrent detection means detects said overcurrent in said second direction, said overcurrent detection means only blocks a portion of said drive signal corresponding to driving said transmitted current in said second direction.

5. A system in accordance with claim 4, wherein:
- said drive signal includes first and second current source signals and first and second current sink signals; and
- said overcurrent detection means only blocks said first and second current source signals.

6. A system in accordance with claim 4, wherein:
- said drive signal includes first and second current source signals and first and second current sink signals; and
- said overcurrent detection means only blocks said first and second current sink signals.

* * * * *